(12) United States Patent
Kim et al.

(10) Patent No.: US 10,657,396 B1
(45) Date of Patent: May 19, 2020

(54) METHOD AND DEVICE FOR ESTIMATING PASSENGER STATUSES IN 2 DIMENSION IMAGE SHOT BY USING 2 DIMENSION CAMERA WITH FISHEYE LENS

(71) Applicant: STRADVISION, INC., Pohang-si (KR)

(72) Inventors: Kye-Hyeon Kim, Seoul (KR); Yongjoong Kim, Pohang-si (KR); Hak-Kyoung Kim, Pohang-si (KR); Woonhyun Nam, Pohang-si (KR); SukHoon Boo, Anyang-si (KR); Myungchul Sung, Pohang-si (KR); Dongsoo Shin, Suwon-si (KR); Donghun Yeo, Pohang-si (KR); Wooju Ryu, Pohang-si (KR); Myeong-Chun Lee, Pohang-si (KR); Hyungsoo Lee, Seoul (KR); Taewoong Jang, Seoul (KR); Kyungjoong Jeong, Pohang-si (KR); Hongmo Je, Pohang-si (KR); Hojin Cho, Pohang-si (KR)

(73) Assignee: STRADVISION, INC., Pohang-si (KR)

( * ) Notice: Subject to any disclaimer, the term of this patent is extended or adjusted under 35 U.S.C. 154(b) by 0 days.

(21) Appl. No.: 16/731,087

(22) Filed: Dec. 31, 2019

Related U.S. Application Data

(60) Provisional application No. 62/798,527, filed on Jan. 30, 2019.

(51) Int. Cl.
*G06K 9/00* (2006.01)
*G06K 9/62* (2006.01)
*G06T 7/73* (2017.01)

(52) U.S. Cl.
CPC ..... *G06K 9/00838* (2013.01); *G06K 9/00335* (2013.01); *G06K 9/6232* (2013.01);
(Continued)

(58) Field of Classification Search
CPC .......... G06K 9/00838; G06K 9/00335; G06K 9/6232; G06T 7/74
See application file for complete search history.

(56) References Cited

U.S. PATENT DOCUMENTS 6,049,747 A * 4/2000 Nakajima ............. B60N 2/002
340/576
7,607,509 B2 * 10/2009 Schmiz ............ B60R 21/01538
180/274
(Continued)

*Primary Examiner* — Utpal D Shah
(74) *Attorney, Agent, or Firm* — Xsensus LLP

(57) ABSTRACT

A method for detecting passenger statuses by analyzing a 2D interior image of a vehicle is provided. The method includes steps of: a passenger status-detecting device (a) inputting the 2D interior image taken with a fisheye lens into a pose estimation network to acquire pose points corresponding to passengers; and (b) (i) calculating location information on the pose points relative to a preset reference point by referring to a predetermined pixel-angle table, if a grid board has been placed in the vehicle, the pixel-angle table has been created such that vertical angles and horizontal angles, formed by a first line and second lines, correspond to pixels of grid corners, in which the first line connects a camera and a top center of the grid board and the second lines connects the corners and the camera and (ii) detecting the passenger statuses by referring to the location information.

12 Claims, 9 Drawing Sheets

(52) U.S. Cl.
CPC ...... *G06T 7/74* (2017.01); *G06T 2207/30196* (2013.01); *G06T 2207/30268* (2013.01)

(56) References Cited

U.S. PATENT DOCUMENTS

| | | | | |
|---|---|---|---|---|
| 7,983,817 | B2* | 7/2011 | Breed | B60N 2/002 250/578.1 |
| 8,391,554 | B2* | 3/2013 | Lee | G06K 9/00248 180/271 |
| 10,043,083 | B2* | 8/2018 | Ding | B60R 1/04 |
| 10,059,263 | B2* | 8/2018 | Paszkowicz | B60Q 3/76 |
| 2004/0202353 | A1* | 10/2004 | Doi | G06K 9/00604 382/115 |
| 2008/0226175 | A1* | 9/2008 | Suzuki | G06K 9/00597 382/190 |
| 2014/0240501 | A1* | 8/2014 | Newman | G06T 7/77 348/148 |
| 2015/0109429 | A1* | 4/2015 | Inoue | A61B 5/163 348/78 |
| 2016/0001781 | A1* | 1/2016 | Fung | G16H 50/20 701/36 |
| 2019/0065873 | A1* | 2/2019 | Wang | G06K 9/00355 |
| 2019/0206084 | A1* | 7/2019 | Noble | G06T 7/73 |
| 2019/0272436 | A1* | 9/2019 | Kuehnle | G06Q 50/30 |

\* cited by examiner

METHOD AND DEVICE FOR ESTIMATING PASSENGER STATUSES IN 2 DIMENSION IMAGE SHOT BY USING 2 DIMENSION CAMERA WITH FISHEYE LENS

CROSS REFERENCE TO RELATED APPLICATION

This application claims the benefit of priority to U.S. Provisional Patent Application No. 62/798,527, filed on Jan. 30, 2019, the entire contents of which being incorporated herein by reference.

FIELD OF THE DISCLOSURE

The present disclosure relates to a method and a device for detecting passenger statuses using a 2D camera; and more particularly, to the method and the device for detecting the passenger statuses using a 2D interior image of a vehicle acquired from the 2D camera with a fisheye lens.

BACKGROUND OF THE DISCLOSURE

Generally, a vehicle is equipped with at least one safety device for user convenience and safety.

Particularly, in case of a car accident, various applications are used to activate the safety device for the safety of a passenger by using a distance from the safety device to the passenger such as a driver.

For example, when an airbag is deployed due to the car accident, inflation time of the airbag is increased if a distance between the airbag and the passenger is long, and the inflation time of the airbag is decreased if the distance between the airbag and the passenger is short. Thus the airbag is deployed according to the distance between the airbag and the passenger, thereby preventing a secondary injury caused by the collision.

In addition, by using the distance to the driver, who is one of the passengers of the vehicle, when an abnormal situation such as bending-over of the driver is detected, an alarm is sounded, thereby preventing accidents due to distraction.

The distance to the passenger used for performing the operation of the safety devices as such is measured using various sensors.

However, when the distance to the passenger is measured using the sensors, it is difficult to acquire accurate sensor information adequate to various positions of the passenger and changing driving environments, and the various sensors for distance measurement increase the cost.

Accordingly, the inventors of the present disclosure propose a method for measuring the body position of the passenger at a lower cost than conventional methods.

SUMMARY OF THE DISCLOSURE

It is an object of the present disclosure to solve all the aforementioned problems.

It is another object of the present disclosure to detect one or more passenger statuses of one or more passengers without an increase in cost.

It is still another object of the present disclosure to detect the passenger statuses without regard to a driving environment.

It is still yet another object of the present disclosure to detect the passenger statuses, minimizing information to process.

In accordance with one aspect of the present disclosure, there is provided a method for detecting one or more passenger statuses by analyzing an interior image of a vehicle, including steps of: (a) if at least one 2D interior image of an interior of the vehicle taken by at least one camera with a fisheye lens is acquired, a passenger status-detecting device performing a process of inputting the 2D interior image into a pose estimation network, to thereby allow the pose estimation network to acquire one or more pose points corresponding to each of one or more passengers from the 2D interior image; and (b) the passenger status-detecting device performing (i) a process of calculating location information on the pose points corresponding to each of the passengers relative to a preset reference point of the vehicle by referring to a predetermined pixel-angle table, wherein, on condition that a grid board of grid cells has been placed in the interior of the vehicle, the pixel-angle table has been created such that each of vertical angles and each of horizontal angles, formed by a first line and each of second lines, correspond to each of pixels of each of corners of the grid cells, in which the first line connects the camera and a top center of the grid board on a grid image taken by the camera, and each of the second lines connects each of the corners and the camera and (ii) a process of detecting each of the passenger statuses by referring to the location information on the pose points corresponding to each of the passengers.

As one example, at the step of (b), the passenger status-detecting device performs (i) a process of acquiring a specific height of a specific pose point by bilinear interpolation using the location information on corners of a specific grid cell where the specific pose point is located among the pose points corresponding to each of the passengers, (ii) a process of acquiring a specific vertical angle and a specific horizontal angle of the specific pose point by bilinear interpolation using the vertical angles and the horizontal angles of the corners of the grid cells, and (iii) a process of acquiring a specific length distance and a specific width distance between the specific pose point and the reference point by referring to the specific height, the specific vertical angle, and the specific horizontal angle.

As one example, on condition that a projected reference point and a specific projected pose point are projection of the reference point and the specific pose point respectively onto a plane formed by overall length direction and overall width direction of the vehicle, the specific length distance is between the projected reference point and the specific projected pose point, and the specific width distance is between the projected pose point and a base line protracted from the projected reference point toward the overall length direction.

As one example, the method further comprises a step of: (c) the passenger status-detecting device performing one of (i) a process of instructing at least one application of the vehicle, to be used for protecting the passengers in an emergency of the vehicle, to operate according to each of the passenger statuses and (ii) a process of analyzing one or more behavioral patterns of each of the passengers by referring to each of the passenger statuses, to thereby confirm each of driving-safety statuses of each of the passengers.

As one example, at the step of (a), the passenger status-detecting device performs a process of instructing the pose estimation network to (i) output one or more feature tensors with one or more channels corresponding to the 2D interior image via a feature extraction network, (ii) generate at least one keypoint heatmap and at least one part affinity field with one or more channels corresponding to each of the feature tensors via a keypoint heatmap & part affinity field extractor, and (iii) extract one or more keypoints from the keypoint heatmap via a keypoint detector, to group the extracted keypoints by referring to the part affinity field, and thus to generate the pose points corresponding to each of the passengers.

As one example, at the step of (a), the passenger status-detecting device performs a process of instructing the pose estimation network to (i) output one or more feature tensors with one or more channels corresponding to the 2D interior image via a feature extraction network, (ii) generate at least one heatmap by applying fully-convolution operation to the feature tensors via a fully convolution network, and (iii) acquire the pose points from the heatmap.

In accordance with another aspect of the present disclosure, there is provided a passenger status-detecting device for detecting one or more passenger statuses by analyzing an interior image of a vehicle, including: at least one memory that stores instructions; and at least one processor configured to execute the instructions to perform or support another device to perform: (I) if at least one 2D interior image of an interior of the vehicle taken by at least one camera with a fisheye lens is acquired, a process of inputting the 2D interior image into a pose estimation network, to thereby allow the pose estimation network to acquire one or more pose points corresponding to each of one or more passengers from the 2D interior image, and (II) (i) a process of calculating location information on the pose points corresponding to each of the passengers relative to a preset reference point of the vehicle by referring to a predetermined pixel-angle table, wherein, on condition that a grid board of grid cells has been placed in the interior of the vehicle, the pixel-angle table has been created such that each of vertical angles and each of horizontal angles, formed by a first line and each of second lines, correspond to each of pixels of each of corners of the grid cells, in which the first line connects the camera and a top center of the grid board on a grid image taken by the camera, and each of the second lines connects each of the corners and the camera and (ii) a process of detecting each of the passenger statuses by referring to the location information on the pose points corresponding to each of the passengers.

As one example, at the process of (II), the processor performs (i) a process of acquiring a specific height of a specific pose point by bilinear interpolation using the location information on corners of a specific grid cell where the specific pose point is located among the pose points corresponding to each of the passengers, (ii) a process of acquiring a specific vertical angle and a specific horizontal angle of the specific pose point by bilinear interpolation using the vertical angles and the horizontal angles of the corners of the grid cells, and (iii) a process of acquiring a specific length distance and a specific width distance between the specific pose point and the reference point by referring to the specific height, the specific vertical angle, and the specific horizontal angle.

As one example, on condition that a projected reference point and a specific projected pose point are projection of the reference point and the specific pose point respectively onto a plane formed by overall length direction and overall width direction of the vehicle, the specific length distance is between the projected reference point and the specific projected pose point, and the specific width distance is between the projected pose point and a base line protracted from the projected reference point toward the overall length direction.

As one example, the processor further performs: (III) (i) a process of instructing at least one application of the vehicle, to be used for protecting the passengers in an emergency of the vehicle, to operate according to each of the passenger statuses and (ii) a process of analyzing one or more behavioral patterns of each of the passengers by referring to each of the passenger statuses, to thereby confirm each of driving-safety statuses of each of the passengers.

As one example, at the process of (I), the processor performs a process of instructing the pose estimation network to (i) output one or more feature tensors with one or more channels corresponding to the 2D interior image via a feature extraction network, (ii) generate at least one keypoint heatmap and at least one part affinity field with one or more channels corresponding to each of the feature tensors via a keypoint heatmap & part affinity field extractor, and (iii) extract one or more keypoints from the keypoint heatmap via a keypoint detector, to group the extracted keypoints by referring to the part affinity field, and thus to generate the pose points corresponding to each of the passengers.

As one example, at the process of (I), the processor performs a process of instructing the pose estimation network to (i) output one or more feature tensors with one or more channels corresponding to the 2D interior image via a feature extraction network, (ii) generate at least one heatmap by applying fully-convolution operation to the feature tensors via a fully convolution network, and (iii) acquire the pose points from the heatmap.

In addition, recordable media readable by a computer for storing a computer program to execute the method of the present disclosure is further provided.

BRIEF DESCRIPTION OF THE DRAWINGS

The following drawings to be used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Figure 1:
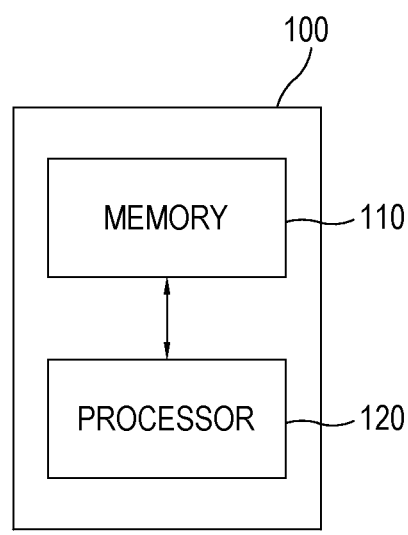
FIG. 1 is a drawing schematically illustrating a passenger status-detecting device for detecting one or more passenger statuses of one or more passengers using at least one 2D camera in accordance with one example embodiment of the present disclosure.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the invention.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, similar reference numerals refer to the same or similar functionality throughout the several aspects.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

The headings and abstract of the present disclosure provided herein are for convenience only and do not limit or interpret the scope or meaning of the embodiments.

To allow those skilled in the art to carry out the present disclosure easily, the example embodiments of the present disclosure by referring to attached diagrams will be explained in detail as shown below.

FIG. 1 is a drawing schematically illustrating a passenger status-detecting device for detecting one or more passenger statuses of one or more passengers by analyzing at least one interior image of a vehicle in accordance with one example embodiment of the present disclosure. By referring to FIG. 1, the passenger status-detecting device 100 may include a memory 110 for storing instructions to detect the passenger statuses using at least one 2D camera and a processor 120 for performing processes corresponding to the instructions in the memory 110 to detect the passenger statuses using the 2D camera.

Specifically, the passenger status-detecting device 100 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include OS and software configuration of applications that achieve specific purposes.

However, such description of the computing device does not exclude an integrated device including any combination of a processor, a memory, a medium, or any other computing components for implementing the present disclosure.

A method for detecting the passenger statuses by analyzing at least one 2D interior image of an interior of the vehicle taken by the 2D camera using the passenger status-detecting device 100 in accordance with one example embodiment of the present disclosure is described as follows.

Figure 2:
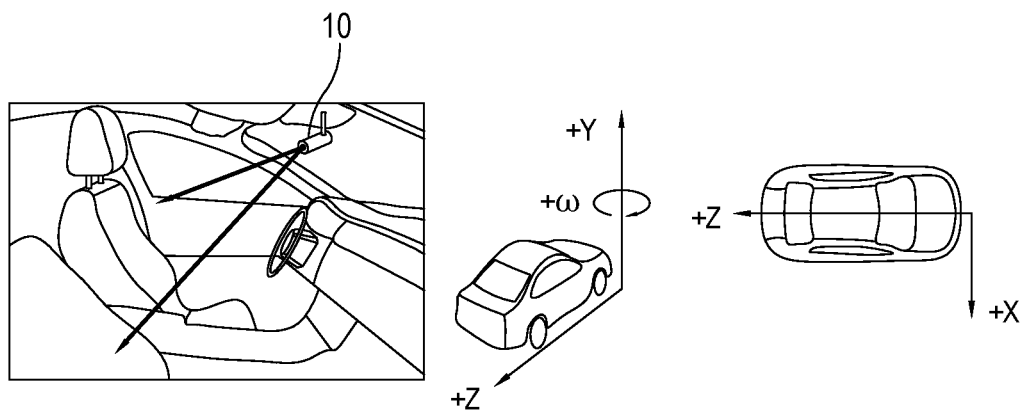
FIG. 2 is a drawing schematically illustrating an installation of the 2D camera and coordinates relative to the 2D camera for detecting the passenger statuses using the 2D camera in accordance with one example embodiment of the present disclosure.

First, by referring to FIG. 2, the 2D interior image of the vehicle taken by at least one camera 10 installed on an inside of the vehicle may be acquired. Herein, the 2D interior image may include one or more passengers such as a driver of the vehicle.

Herein, the camera 10 may be installed in a top front area on the inside of the vehicle, and an installation height of the camera 10 may be acquired by a vertical distance from a preset reference point to an installation point of the camera 10. And, the reference point may be set as a floor inside the vehicle, a vehicle seat, a vehicle dashboard, etc., but the scope of the present disclosure is not limited thereto, may be set as any position that can be used for acquiring the vertical height in the vehicle. The reference point may be a position of an automotive application, e.g., an airbag, of the vehicle to be used for protecting the passengers in an emergency of the vehicle.

Also, the camera 10 may be the 2D camera, and may have at least one fisheye lens capable of giving a wide field of view of the interior of the vehicle.

Herein, the x-axis may be set as corresponding to a width direction of the vehicle, and the y-axis may be set as corresponding to a height direction, i.e., a direction along the camera height, and the z-axis may be set as corresponding to a length direction of the vehicle.

Figure 3:
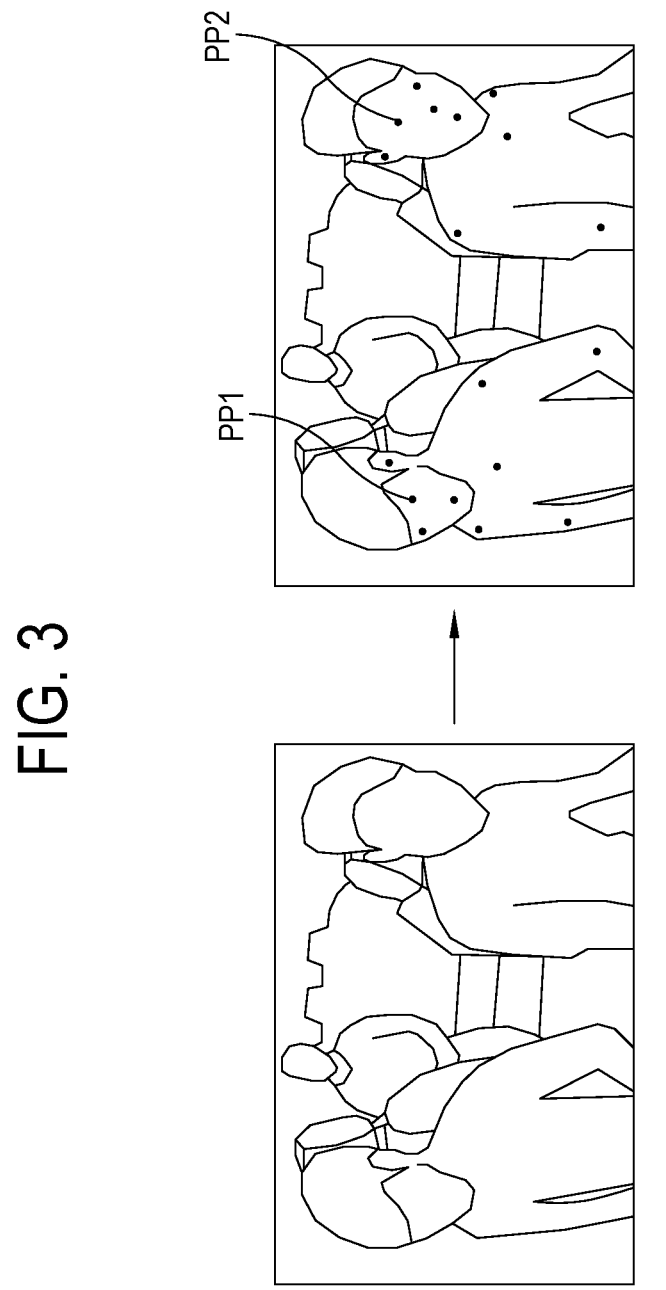
FIG. 3 is a drawing schematically illustrating a process of detecting one or more pose points of the passengers for detecting the passenger statuses using the 2D camera in accordance with one example embodiment of the present disclosure.

Next, by referring to FIG. 3, the passenger status-detecting device 100 may acquire the pose points (pp1, pp2, . . . , ppn) corresponding to each of the passengers from the 2D interior image via a pose estimation network using computer vision technology.

Figure 4:
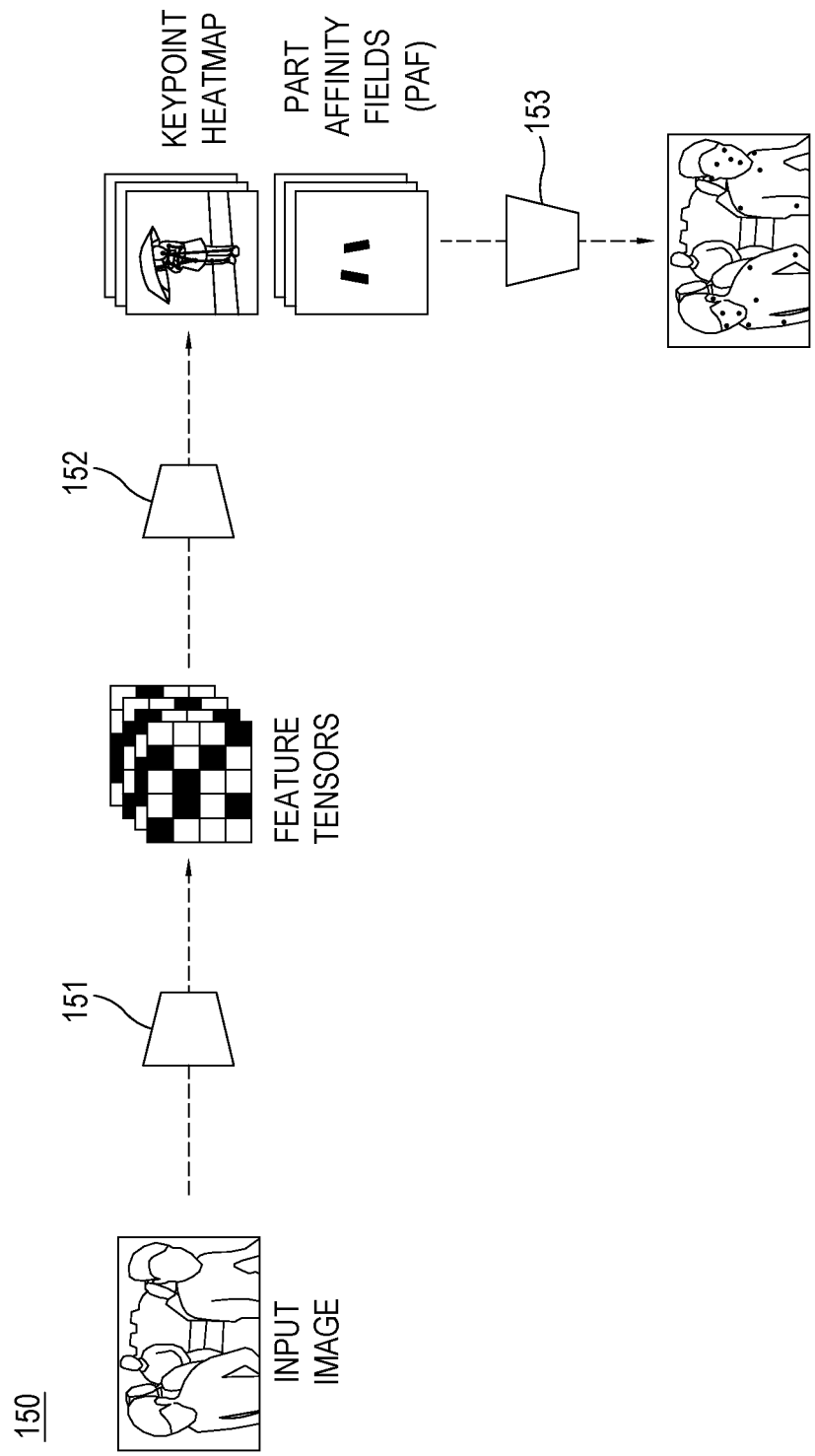
FIG. 4 is a drawing schematically illustrating a method for detecting the pose points of the passengers to be used for detecting the passenger statuses using the 2D camera in accordance with one example embodiment of the present disclosure.

As one example, by referring to FIG. 4, if the 2D interior image is acquired, the pose estimation network 150 may input the 2D interior image into a feature extraction network 151, to thereby allow the feature extraction network 151 to apply convolution operation to the 2D interior image, and thus to generate one or more feature tensors with one or more channels corresponding to the 2D interior image. Herein, the feature extraction network 151 may allow one or more convolution blocks, including one or more convolutional layers capable of performing at least one convolution operation, to apply multiple convolution operations to the 2D interior image.

And, the pose estimation network 150 may input the feature tensors into a keypoint heatmap & part affinity field (PAF) extractor 152, to thereby instruct the keypoint heatmap & part affinity field extractor 152 to generate one or more keypoint heatmaps and one or more part affinity fields corresponding to each of the feature tensors. Herein, the keypoint heatmap & part affinity field extractor 152 may include a fully convolution network. Also, the keypoint heatmap & part affinity field extractor 152 may include one or more 1×1 convolutional layers which apply at least one 1×1 convolution operation to the feature tensors.

Meanwhile, a meaning of the "keypoint heatmap" may represent a combination of heat and a map, which may graphically show various information that can be expressed by colors as heat-like distribution on an image.

And, the part affinity fields may be a kind of vector map representing relations among the keypoints. That is, the part affinity field may be a map showing connections of a specific keypoint with other keypoints, and may be a map representing each of mutual connection probabilities of each of the keypoints in each of keypoint heatmap pairs.

Herein, the keypoint heatmap & part affinity field extractor 152 may detect the relations among the keypoints by using a bipartite matching, to thereby generate the part affinity field. That is, it may be confirmed by the bipartite matching that which keypoints belong to which passengers and that what the relations among the keypoints are.

Thereafter, the pose estimation network 150 may input the keypoint heatmaps and the part affinity fields into a keypoint detector 153, to thereby allow the keypoint detector 153 to extract one or more keypoints from each of the keypoint heatmaps, and may group the extracted keypoints by referring to the part affinity fields, to thereby detect the pose points per each of the passengers which correspond to each of the passengers located in the 2D interior image. Herein, the keypoint detector 153 may extract each of highest points in each of the channels of each of the keypoint heatmaps, that is, each of points having the highest heat value, as each of the keypoints corresponding to each of the keypoint heatmaps, and may pair the keypoints, respectively having their own corresponding highest probabilities of being connected to each other among the extracted keypoints, to thereby group the extracted keypoints by referring to the part affinity fields and acquire the pose points as a result. As one example, a process of connecting a first keypoint among the extracted keypoints and a second keypoint among the extracted keypoints as a pair may be performed if the second keypoint is determined as having its corresponding highest probability of being connected to the first keypoint among the extracted keypoints. Herein, such a process may be performed with respect to all the extracted keypoints. Then, as a result, the extracted keypoints may be classified into one or more groups. Herein, the number of the groups may be determined according to the number of the passengers in the 2D interior image.

As another example, the passenger status-detecting device 100 may perform a process of instructing the pose estimation network 150 to (i) output the feature tensors with the channels corresponding to the 2D interior image via the feature extraction network, (ii) generate at least one heatmap by applying fully-convolution operation to the feature tensors via the fully convolution network, and (iii) acquire the pose points from the heatmap.

Besides, the pose points may be acquired by various ways, and the scope of the present disclosure is not limited thereto.

That is, the pose estimation network may acquire the pose points of the passengers by using Convolutional Pose Machines (CPM), a convolutional neural network, the fully convolution network, or the heatmap, etc.

Next, the passenger status-detecting device 100 may perform (i) a process of calculating location information on the pose points corresponding to each of the passengers relative to the preset reference point of the vehicle by referring to a predetermined pixel-angle table and (ii) a process of detecting each of the passenger statuses by referring to the location information on the pose points corresponding to each of the passengers.

Herein, on condition that a grid board of grid cells has been placed in the interior of the vehicle, the pixel-angle table may have been created such that each of vertical angles and each of horizontal angles, formed by a first line and each of second lines, correspond to each of pixels of each of corners of the grid cells, in which the first line connects the 2D camera and a top center TC of the grid board on a grid image taken by the 2D camera with the fisheye lens, and each of the second lines connects each of the corners SP and the 2D camera.

Figure 5:
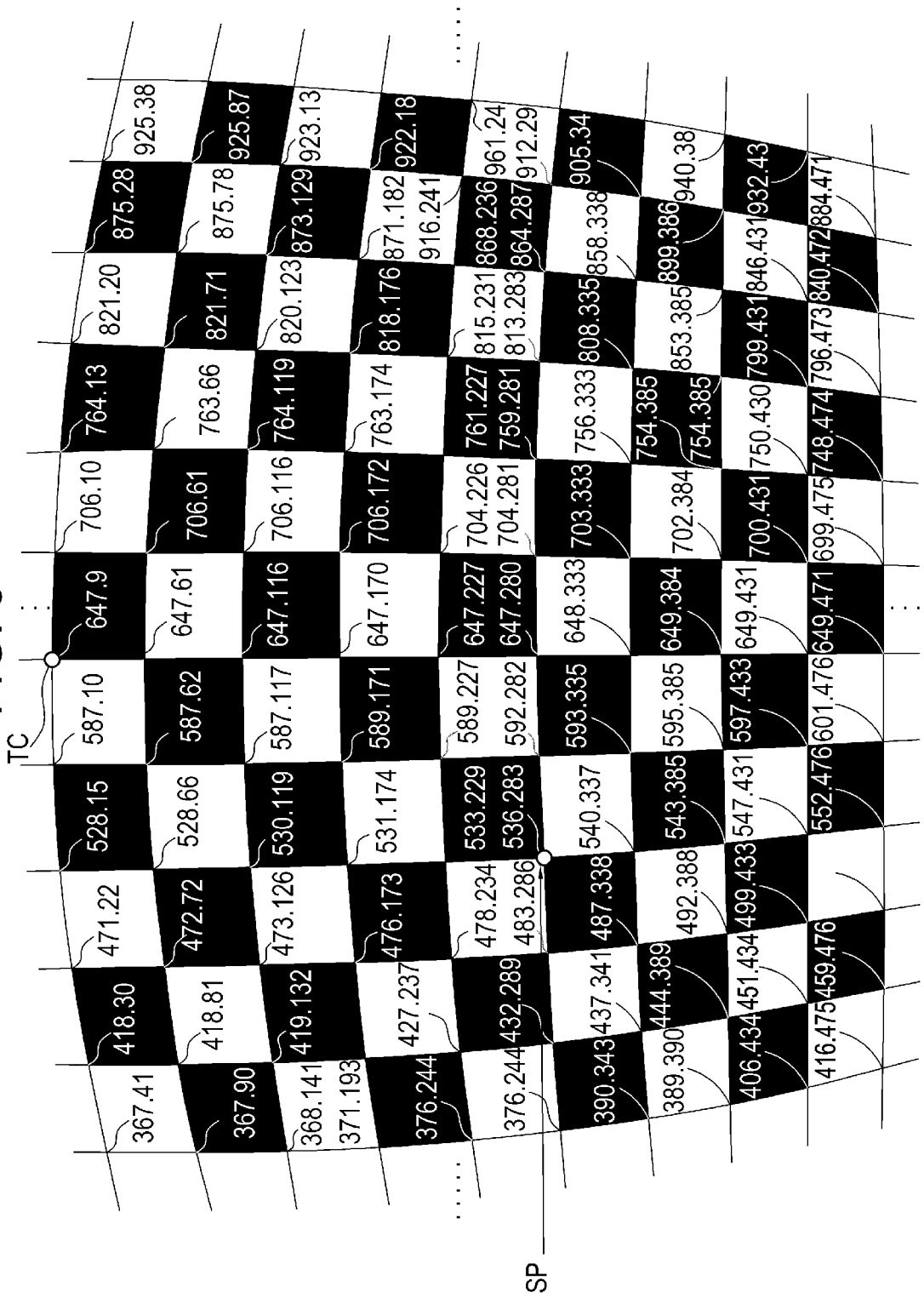
FIG. 5 is a drawing schematically illustrating a grid board to be used for confirming locations of the pose points in the method for detecting the passenger statuses using the 2D camera in accordance with one example embodiment of the present disclosure.

As one example, by referring to FIG. 5, the grid board formed by the grid cells with 2 inch-long sides may be placed in front of the camera on the inside of the vehicle and the grid image, which is a 2D image, may be acquired from the 2D camera with the fisheye lens shooting the grid board.

And, pixel values of the corners SP of each of the grid cells may be detected from the grid image. Herein, if the grid board does not completely fill the interior of the vehicle, it may be virtually extended.

Then, each of heights may be calculated, which is a vertical distance from the reference point to each of the corners of each of the grid cells.

And, the pixel-angle table may be created by (i) measuring each of the vertical angles and each of the horizontal angles, formed by the first line and each of the second lines, in which the first line connects the 2D camera and the top center TC of the grid board on the grid image, and each of the second lines connects each of the corners SP and the 2D camera on the grid image and (ii) matching each of the vertical angles and each of the horizontal angles with each of the pixels corresponding to each of the corners of the grid cells.

Figure 6:
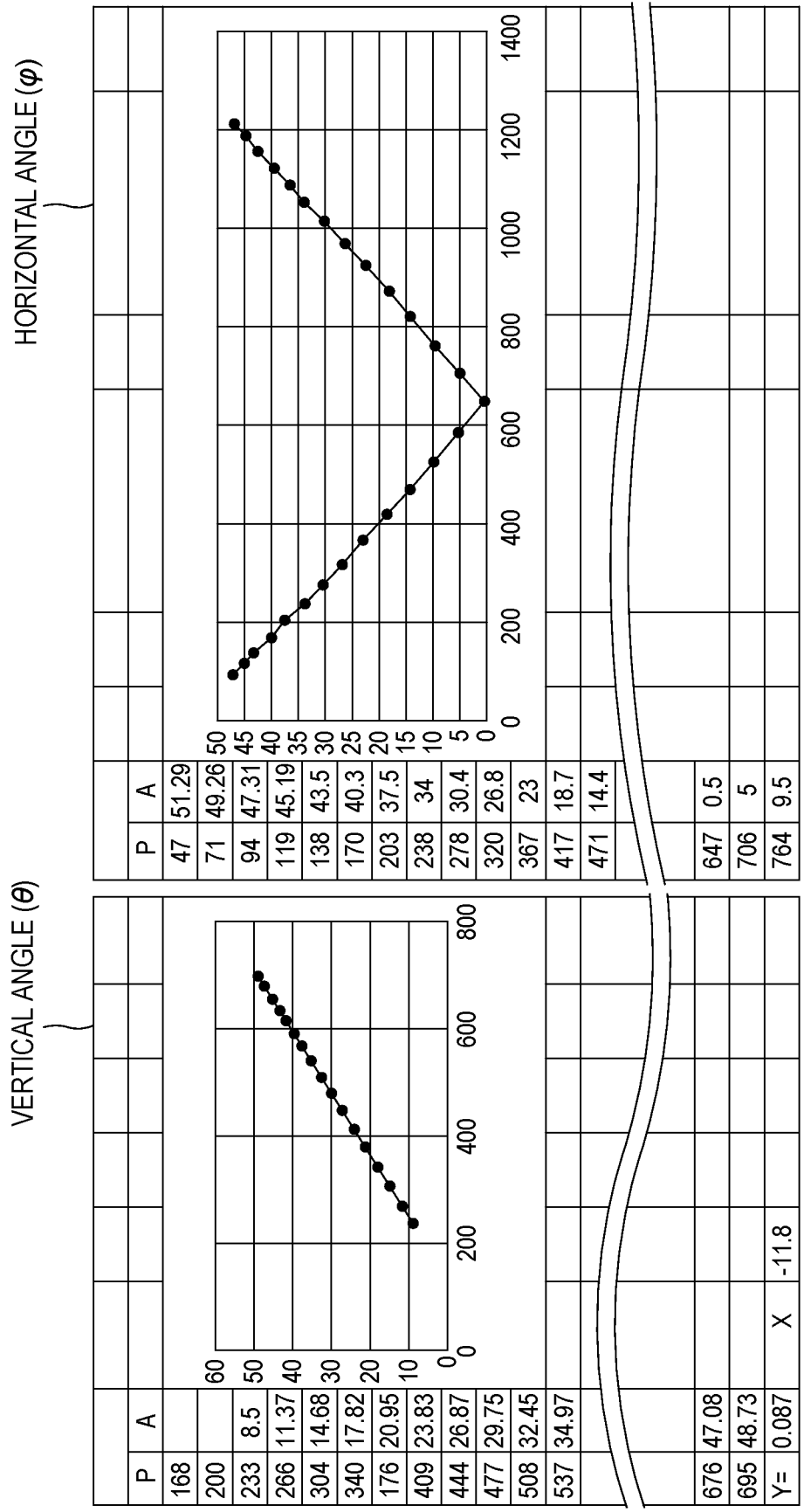
FIG. 6 is a drawing schematically illustrating a pixel-angle table corresponding to the grid board to be used for confirming the locations of the pose points in the method for detecting the passenger statuses using the 2D camera in accordance with one example embodiment of the present disclosure.

Herein, by referring to FIG. 6, as another example different from a process of measuring angles at all of the corners of the grid cells, the vertical angles θ at every pixel located in the vertical direction from the top center may be acquired by measuring the vertical angles θ at the corners on the vertical direction from the top center and deriving an equation representing their relations, and the horizontal angles φ at every pixel located on the horizontal direction from the top center may be acquired by measuring the horizontal angles φ at the corners on the horizontal direction from the top center and deriving an equation representing their relations.

Meanwhile, a laser pointer may be used to measure an angle between the first line and the second lines, at the position of the camera. By using the laser pointer, a rotation angle between the top center TC and the corners SP, to thereby measure an angle between the first line and the second lines.

Meanwhile, a method of acquiring depths of an image from a 2D camera is disclosed in a research paper titled 'Depth and geometry from a single 2d image using triangulation, Y Salih, A S Malik—Multimedia and Expo Workshops (ICMEW), 2012'.

However, the research paper above has an assumption that widths and heights on an image are linearly proportionate to one another so that they can be divided at stated intervals, that is, an angle can be calculated from the image. However, automotive applications of modern vehicles commonly use the fisheye lens for a wide field of view, thus linear division is impossible.

Therefore, the method of the research paper cannot be used for the nonlinear division due to distortion caused by the fisheye lens.

That is, general cameras have an FOV of about 60 degrees to 70 degrees, thus cannot take a whole picture of the interior of the vehicle. Therefore, in this case, the fisheye lens must be used, but because a distorted image from the fisheye lens is difficult to revert back to its undistorted state, the method of the research paper cannot be used.

Therefore, the present disclosure generates the pixel-angle table representing measured angles at each of the corners of the grid cells by using the grid board corresponding to the 2D interior image having nonlinear intervals, and detects depths of the pose points of the passengers by using the pixel-angle table, as described above.

Figure 7:
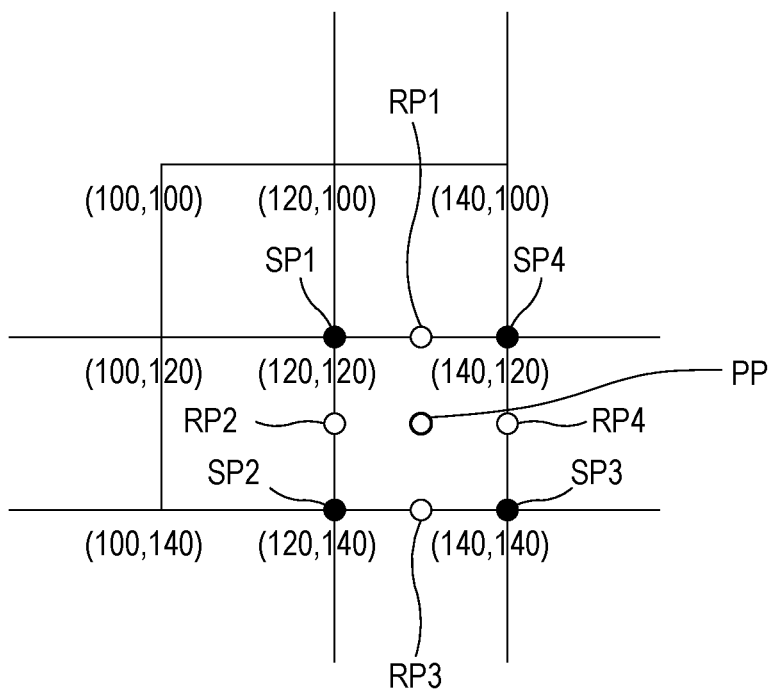
FIG. 7 is a drawing schematically illustrating a process of measuring a height and an angle corresponding to a specific pose point using the pixel-angle table in the method for detecting the passenger statuses using the 2D camera in accordance with one example embodiment of the present disclosure.

That is, by referring to FIG. 7, the passenger status-detecting device 100 may acquire a specific height of a specific pose point PP by bilinear interpolation using the location information on corners SP1, SP2, SP3, and SP4 of a specific grid cell where the specific pose point PP is located, among the pose points corresponding to each of the passengers.

As one example, the passenger status-detecting device 100 may acquire the specific height of the specific pose point PP by bilinear interpolation using heights of the corners SP1 and SP2 among the corners SP1, SP2, SP3, and SP4 of the specific grid cell where the specific pose point PP is located, or by bilinear interpolation using heights of the corners SP3 and SP4.

And, the passenger status-detecting device 100 may acquire a specific vertical angle and a specific horizontal angle of the specific pose point PP by bilinear interpolation using the vertical angles and the horizontal angles included in the location information on the corners SP1, SP2, SP3, and SP4 of the specific grid cell where the specific pose point PP is located.

As one example, the passenger status-detecting device 100 may (i) calculate the vertical angles and the horizontal angles at (i-1) contact points RP1 and RP3 where the specific pose point PP meets a plane of the specific grid cell in the vertical direction and (i-2) contact points RP2 and RP4 where the specific pose point PP meets the plane of the specific grid cell in the horizontal direction, by bilinear interpolation using the vertical angles and the horizontal angles at the corners SP1, SP2, SP3, and SP4 of the specific grid cell, or (ii) retrieve each of the vertical angles and the horizontal angles at each of the contact points RP1, RP2, RP3, and RP4 from the pixel-angle table, as in FIG. 6, created by an equation.

And, the passenger status-detecting device 100 may acquire the specific vertical angle of the specific pose point PP by bilinear interpolation using the vertical angle of the contact point RP1 and the vertical angle of the contact point RP3, and may acquire the specific horizontal angle of the specific pose point PP by bilinear interpolation using the horizontal angle of the contact point RP2 and the horizontal angle of the contact point RP4.

Thereafter, the passenger status-detecting device 100 may acquire a specific length distance and a specific width distance between the specific pose point and the reference point by referring to the specific height of the specific pose point, the specific vertical angle of the specific pose point, and the specific horizontal angle of the specific pose point.

Figure 8:
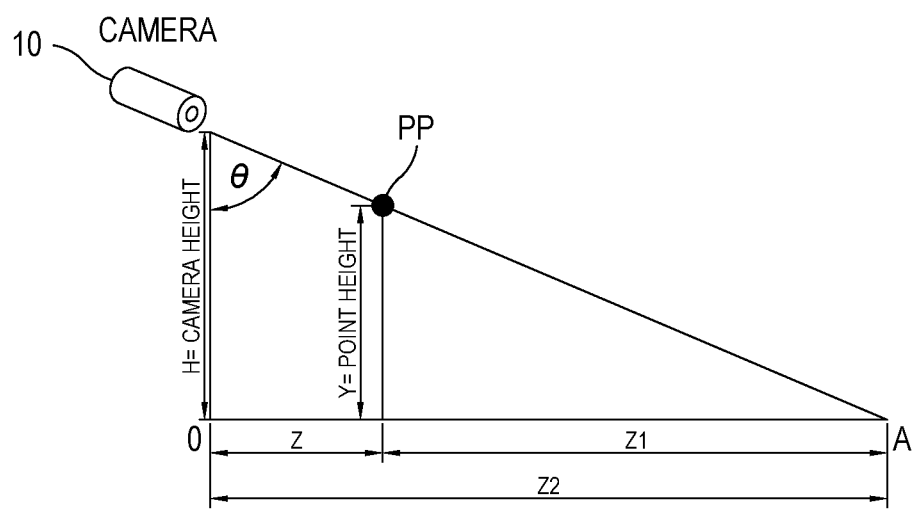
FIG. 8 is a drawing schematically illustrating a process of detecting a length distance of a pose point in the method for detecting the passenger statuses using the 2D camera in accordance with one example embodiment of the present disclosure.

As one example, by referring to FIG. 8, on condition that a height H of the camera 10, a height Y of the specific pose point PP, and the specific vertical angle θ of the specific pose point PP, from the reference point have been acquired, the passenger status-detecting device 100 may measure the specific length distance Z between the specific pose point PP and the reference point by using an equation 1 below. Herein, on condition that a projected reference point and a specific projected pose point are respective projections of the reference point and the specific pose point PP onto a plane formed by overall length direction and overall width direction of the vehicle, the specific length distance Z may be a distance between the projected reference point and the specific projected pose point.

$$Z2 = H \times \tan(\theta)$$
$$Z1 = \frac{Y \times Z2}{H}$$
$$Z = Z2 - Z1$$

⟨Equation 1⟩

That is, according to the equation 1, the passenger status-detecting device 100 may calculate a distance Z2 between the reference point O and a contact point A where a line passing through the camera 10 and the specific pose point PP meets a plane corresponding to the reference point, by using the vertical angle between the height H of the camera and the specific pose point PP. And, the passenger status-detecting device 100 may calculate a width distance Z1 between the contact point A and the specific pose point PP by using the distance Z2 between the calculated contact point A and the reference point O, the height H of the camera 10, and the height Y of the specific pose point PP. Thereafter, the passenger status-detecting device 100 may calculate a width distance Z of the specific pose point PP by using the width distance Z1 between the contact point A and the specific pose point PP, and the distance Z2 between the contact point A and the reference point O.

Figure 9:
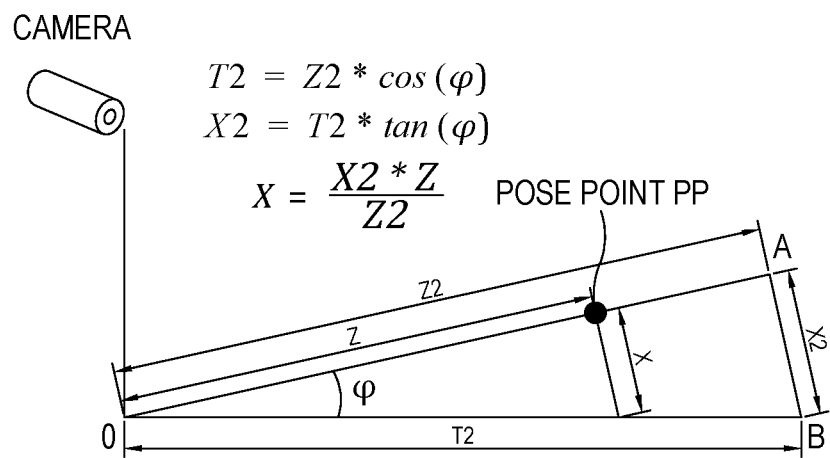
FIG. 9 is a drawing schematically illustrating a process of detecting a width distance of the pose point in the method for detecting the passenger statuses using the 2D camera in accordance with one example embodiment of the present disclosure.

Thereafter, by referring to FIG. 9, on condition that (i) the horizontal angle of the specific pose point PP, (ii) the distance Z2 acquired by using the equation 1 and (iii) the width distance Z acquired by using the equation 1, have been acquired, the passenger status-detecting device 100 may calculate a specific width distance X between the specific pose point PP and the reference point using an equation 2 below. Herein, on condition that the projected reference point and the specific projected pose point are projection of the reference point and the specific pose point PP respectively onto the plane formed by the overall length direction and the overall width direction of the vehicle, the specific width distance X may be a distance between the projected pose point and a base line protracted from the projected reference point in the overall length direction.

$$T2 = Z2 \times \cos(\varphi)$$
$$X2 = T2 \times \tan(\varphi)$$
$$X = \frac{X2 \times Z}{Z2}$$
⟨Equation 2⟩

That is, according to the equation 2, a distance T2 between the reference point and a contact point B may be calculated by using (i) the width distance Z2 between the contact point A and the specific pose point PP and (ii) the specific horizontal angle of the specific pose point PP, where the line protracted from the reference point in the overall width direction meets a line protracted from the contact point A at a right angle on the contact point B. And, the passenger status-detecting device 100 may calculate a distance X2 between the contact point A and the contact point B by using the distance T2 between the contact point B and the reference point and the specific horizontal angle of the specific pose point PP, and may calculate a width distance X of the specific pose point PP by using the distance X2 between the contact point A and the contact point B, the distance Z2 between the contact point A and the reference point O, and the width distance Z of the specific pose point PP.

Next, as described above, the passenger status-detecting device 100 may recognize information on the passenger statuses, i.e., heights where the passengers are positioned, positions of the passengers in the left and the right direction inside the vehicle and distances of the passengers from the reference point, by measuring each of distances between the camera and each of the pose points corresponding to each of the passengers, and perform the various automotive applications for safety and convenience of the passengers according to the recognized passenger statuses.

As one example, the passenger status-detecting device 100 may perform a process of instructing at least one automotive application, i.e., the airbag, of the vehicle, to be used for protecting the passengers in an emergency of the vehicle, to operate according to each of the passenger statuses.

Also, the passenger status-detecting device 100 may perform a process of analyzing one or more behavioral patterns of each of the passengers by referring to each of the passenger statuses, to thereby confirm each of driving-safety statuses of each of the passengers.

As one example, the passenger status-detecting device 100 may determine if a passenger like the driver is sleepy, if the passenger bends over dangerously, and if the passenger cannot maintain a proper driving position due to a disease, etc., by using moving patterns of the location information on the pose points of the passenger, and may give an alarm according to the passenger statuses or may perform the automotive application to be used for the emergency.

As described above, the present disclosure detects the pose points corresponding to the passengers by performing pose estimation on the interior image acquired by the camera, performs depth estimation by a single camera on the detected pose points, performs status recognition like the distances to the passengers, the heights of the positions of the passengers, seated locations of the passengers, by using the estimated depths, and perform the automotive applications according to the recognized statuses of the passengers.

The present disclosure has an effect of reducing cost by detecting the passenger statuses by analyzing the 2D interior image of the vehicle taken by the camera, compared to a conventional method using the sensors.

The present disclosure has another effect of detecting the passenger statuses without regard to the surroundings of the vehicle because the passenger statuses are detected by analyzing the 2D interior image of the vehicle taken by the camera.

The present disclosure has still another effect of improving processing speed since information to be processed is less than that of the conventional method using the sensors, by detecting the passenger statuses through analyzing the 2D interior image of the vehicle taken by the camera.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to those skilled in the art. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present invention and vice versa.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for detecting one or more passenger statuses by analyzing an interior image of a vehicle, comprising steps of:
(a) if at least one 2D interior image of an interior of the vehicle taken by at least one camera with a fisheye lens is acquired, a passenger status-detecting device performing a process of inputting the 2D interior image into a pose estimation network, to thereby allow the pose estimation network to acquire one or more pose points corresponding to each of one or more passengers from the 2D interior image; and (b) the passenger status-detecting device performing (i) a process of calculating location information on the pose points corresponding to each of the passengers relative to a preset reference point of the vehicle by referring to a predetermined pixel-angle table, wherein, on condition that a grid board of grid cells has been placed in the interior of the vehicle, the pixel-angle table has been created such that each of vertical angles and each of horizontal angles, formed by a first line and each of second lines, correspond to each of pixels of each of corners of the grid cells, in which the first line connects the camera and a top center of the grid board on a grid image taken by the camera, and each of the second lines connects each of the corners and the camera and (ii) a process of detecting each of the passenger statuses by referring to the location information on the pose points corresponding to each of the passengers.

2. The method of claim 1, wherein, at the step of (b), the passenger status-detecting device performs (i) a process of acquiring a specific height of a specific pose point by bilinear interpolation using the location information on corners of a specific grid cell where the specific pose point is located among the pose points corresponding to each of the passengers, (ii) a process of acquiring a specific vertical angle and a specific horizontal angle of the specific pose point by bilinear interpolation using the vertical angles and the horizontal angles of the corners of the grid cells, and (iii) a process of acquiring a specific length distance and a specific width distance between the specific pose point and the reference point by referring to the specific height, the specific vertical angle, and the specific horizontal angle.

3. The method of claim 2, wherein, on condition that a projected reference point and a specific projected pose point are projection of the reference point and the specific pose point respectively onto a plane formed by overall length direction and overall width direction of the vehicle, the specific length distance is between the projected reference point and the specific projected pose point, and the specific width distance is between the projected pose point and a base line protracted from the projected reference point toward the overall length direction.

4. The method of claim 1, further comprising a step of:
(c) the passenger status-detecting device performing one of (i) a process of instructing at least one application of the vehicle, to be used for protecting the passengers in an emergency of the vehicle, to operate according to each of the passenger statuses and (ii) a process of analyzing one or more behavioral patterns of each of the passengers by referring to each of the passenger statuses, to thereby confirm each of driving-safety statuses of each of the passengers.

5. The method of claim 1, wherein, at the step of (a), the passenger status-detecting device performs a process of instructing the pose estimation network to (i) output one or more feature tensors with one or more channels corresponding to the 2D interior image via a feature extraction network, (ii) generate at least one keypoint heatmap and at least one part affinity field with one or more channels corresponding to each of the feature tensors via a keypoint heatmap & part affinity field extractor, and (iii) extract one or more keypoints from the keypoint heatmap via a keypoint detector, to group the extracted keypoints by referring to the part affinity field, and thus to generate the pose points corresponding to each of the passengers.

6. The method of claim 1, wherein, at the step of (a), the passenger status-detecting device performs a process of instructing the pose estimation network to (i) output one or more feature tensors with one or more channels corresponding to the 2D interior image via a feature extraction network, (ii) generate at least one heatmap by applying fully-convolution operation to the feature tensors via a fully convolution network, and (iii) acquire the pose points from the heatmap.

7. A passenger status-detecting device for detecting one or more passenger statuses by analyzing an interior image of a vehicle, comprising:
at least one memory that stores instructions; and
at least one processor configured to execute the instructions to perform or support another device to perform:
(I) if at least one 2D interior image of an interior of the vehicle taken by at least one camera with a fisheye lens is acquired, a process of inputting the 2D interior image into a pose estimation network, to thereby allow the pose estimation network to acquire one or more pose points corresponding to each of one or more passengers from the 2D interior image, and (II) (i) a process of calculating location information on the pose points corresponding to each of the passengers relative to a preset reference point of the vehicle by referring to a predetermined pixel-angle table, wherein, on condition that a grid board of grid cells has been placed in the interior of the vehicle, the pixel-angle table has been created such that each of vertical angles and each of horizontal angles, formed by a first line and each of second lines, correspond to each of pixels of each of corners of the grid cells, in which the first line connects the camera and a top center of the grid board on a grid image taken by the camera, and each of the second lines connects each of the corners and the camera and (ii) a process of detecting each of the passenger statuses by referring to the location information on the pose points corresponding to each of the passengers.

8. The passenger status-detecting device of claim 7, wherein, at the process of (II), the processor performs (i) a process of acquiring a specific height of a specific pose point by bilinear interpolation using the location information on corners of a specific grid cell where the specific pose point is located among the pose points corresponding to each of the passengers, (ii) a process of acquiring a specific vertical angle and a specific horizontal angle of the specific pose point by bilinear interpolation using the vertical angles and the horizontal angles of the corners of the grid cells, and (iii) a process of acquiring a specific length distance and a specific width distance between the specific pose point and the reference point by referring to the specific height, the specific vertical angle, and the specific horizontal angle.

9. The passenger status-detecting device of claim 8, wherein, on condition that a projected reference point and a specific projected pose point are projection of the reference point and the specific pose point respectively onto a plane formed by overall length direction and overall width direction of the vehicle, the specific length distance is between the projected reference point and the specific projected pose point, and the specific width distance is between the projected pose point and a base line protracted from the projected reference point toward the overall length direction.

10. The passenger status-detecting device of claim 7, wherein the processor further performs:

(III) (i) a process of instructing at least one application of the vehicle, to be used for protecting the passengers in an emergency of the vehicle, to operate according to each of the passenger statuses and (ii) a process of analyzing one or more behavioral patterns of each of the passengers by referring to each of the passenger statuses, to thereby confirm each of driving-safety statuses of each of the passengers.

11. The passenger status-detecting device of claim 7, wherein, at the process of (I), the processor performs a process of instructing the pose estimation network to (i) output one or more feature tensors with one or more channels corresponding to the 2D interior image via a feature extraction network, (ii) generate at least one keypoint heatmap and at least one part affinity field with one or more channels corresponding to each of the feature tensors via a keypoint heatmap & part affinity field extractor, and (iii) extract one or more keypoints from the keypoint heatmap via a keypoint detector, to group the extracted keypoints by referring to the part affinity field, and thus to generate the pose points corresponding to each of the passengers.

12. The passenger status-detecting device of claim 7, wherein, at the process of (I), the processor performs a process of instructing the pose estimation network to (i) output one or more feature tensors with one or more channels corresponding to the 2D interior image via a feature extraction network, (ii) generate at least one heatmap by applying fully-convolution operation to the feature tensors via a fully convolution network, and (iii) acquire the pose points from the heatmap.

* * * * *